Oct. 17, 1950 — R. H. SNYDER — 2,526,092
STRAW LINE PULLER
Filed Aug. 5, 1947 — 2 Sheets-Sheet 1

Inventor
Richard H. Snyder
By Clarence A. O'Brien
and Harvey B. Jacobson
Attorneys

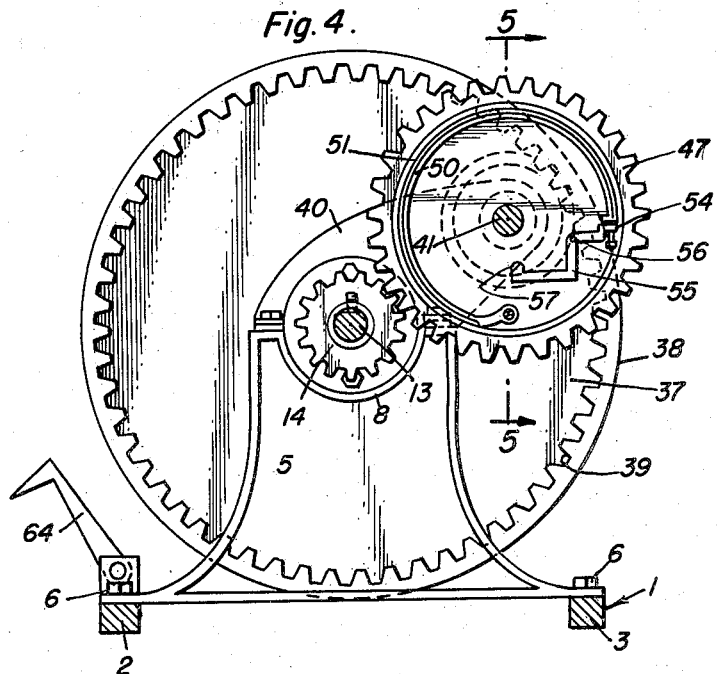
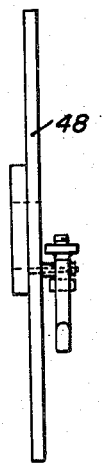
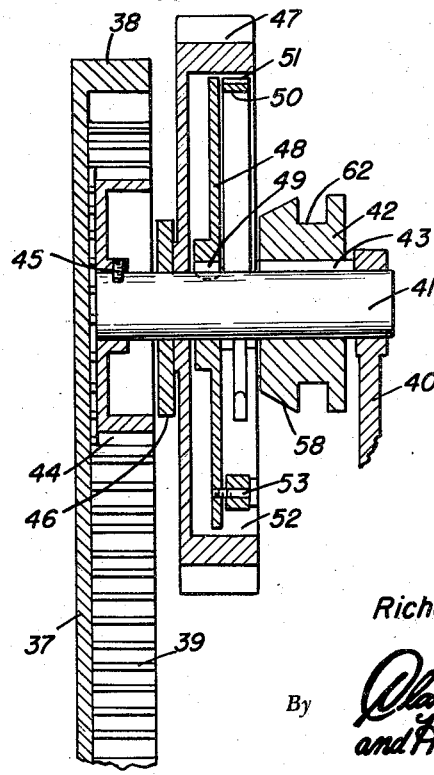

Patented Oct. 17, 1950

2,526,092

UNITED STATES PATENT OFFICE 2,526,092

STRAW LINE PULLER

Richard H. Snyder, Church Creek, Queen Charlotte Islands, British Columbia, Canada Application August 5, 1947, Serial No. 766,388

5 Claims. (Cl. 254—187)

1

This invention relates to improvements in straw line pullers used by lumbermen for hauling logs to a spar tree from various points in the woods where the trees are felled and the logs sawed.

Another object of the invention is to provide an improved straw line puller or portable power operated winch having brake and clutch mechanisms incorporated therewith whereby logs may be readily and easily hauled from points where they are cut or felled to the usual spar tree and logging donkey.

Another object of the invention is to provide an improved straw line puller which is highly efficient in operation, and relatively inexpensive to manufacture and produce.

In the accompanying drawings which form a part of this application,

Figure 4 is a view taken on the line 4—4 of Figure 1;

Figure 5 is a sectional view taken on the line 5—5 of Figure 4, and

Figure 6 is an edge view of the clutch supporting plate.

Like characters of reference are used throughout the following specification and the accompanying drawings to designate corresponding parts.

Figure 1:
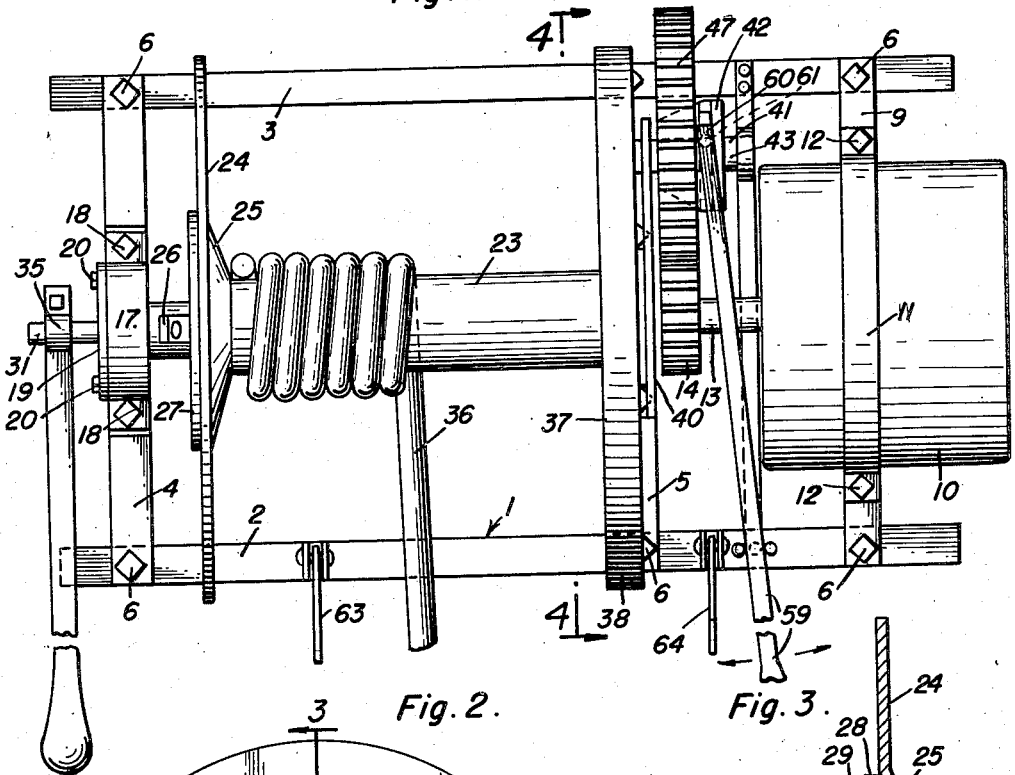
Figure 1 is a top plan view of the improved straw line puller apparatus.
Figure 2:
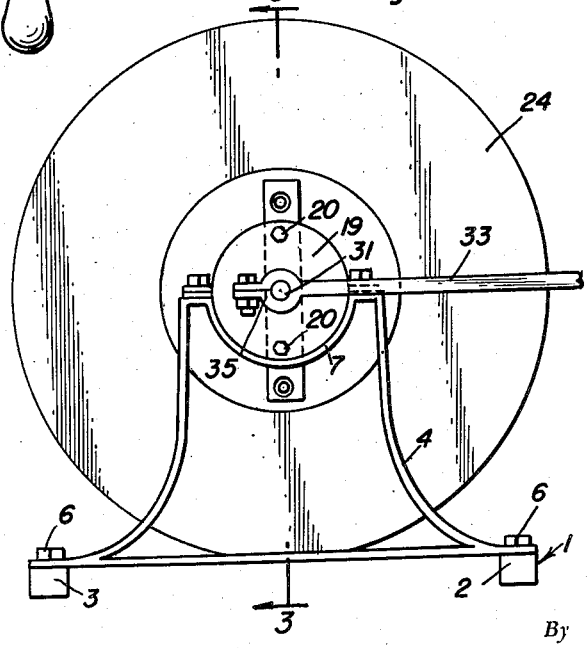
Figure 2 is an end elevation of the improved straw line puller apparatus.
Figure 3:
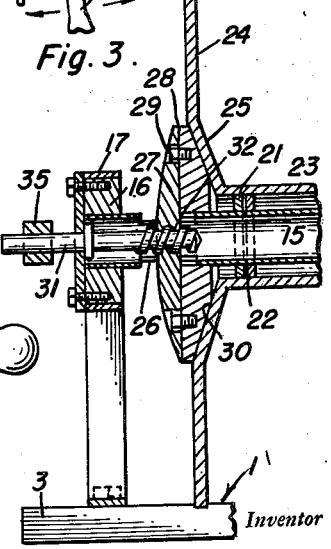
Figure 3 is a sectional view taken on the line 3—3 of Figure 2.

In carrying out the invention, there is provided a substantially rectangular pack board or bed frame generally designated by the reference numeral 1, comprising the parallel longitudinally extending supporting beams or rails 2 and 3.

A pair of transversely extending metal supporting brackets 4 and 5 are secured to said beams or rails 2 and 3, by means of the bolts 6, and are shaped to provide the semi-circular bearing collars or mounts 7 and 8, while a third similarly formed bracket 9 is disposed at the opposite end of said frame 1, and supports an electric motor 10 which is held in fixed position by means of the semi-circular clamping band 11 which overlies the motor 10 and is secured in fixed position by means of the bolts 12 extending therethrough and into said bracket 9. A motor shaft 13 is provided and supports the gear 14 for driving the hereinafter described winch.

A tubular shaft 15 is fixed in the end bearings 16 which are held in the collars or mounts 7 and 8 at the opposite ends of the brackets 4 and

2

5 by means of the semi-circular clamping bands 17 and securing bolts 18.

Disk-shaped end plates 19 are secured to the bearings 16 by means of the bolts 20.

Suitable bearings 21 and oil retainer washers 22 are disposed about the opposite ends of the tubular shaft 15, and support the winch drum 23 which is provided with an integral disk-shaped end plate 24 whose inner portion is slightly angled inwardly as at 25 adjacent the drum body 23, thereby forming a braking surface on its outer side.

The outer end of the tubular shaft 15 is notched as at 26 to permit the brake disk 27 to slide back and forth with the brake block 28 secured thereto, by means of the bolts 29, so that the annular sloping braking surface 30 engages the braking surface 25 on the drum end plate 24, when the threaded brake operating bolt 31 which extends through the interiorly threaded axially disposed bore 32 in the brake disk 27 is rotated by means of the brake operating lever 33 attached by means of the clamp 35 on its inner end to the outer end of said brake operating bolt 31.

A cable 36 of any desired diameter and length is secured to the winch drum 23 for attaching to logs (not shown) which will be hauled by said power driven winch to a point adjacent the usual spar tree and logging donkey (not shown).

A disk-shaped end plate 37 is formed on the inner end of the winch drum 23 with the circumferential rim 38 and internal ring gear 39 therein.

The bracket arm 40 is secured to the transversely extending bracket 5 and non-rotatably supports the stub shaft 41. A sliding clutch 42, is held upon the stub shaft 41 by means of the key 43, and a small gear 44 is fixed to the opposite end of the stub shaft 41 by means of the set screw 45, and meshes with the internal ring gear 39 for driving the drum 23. A washer 46 is disposed about the stub shaft 41 next to the gear 43, and a large idler gear 47 is loosely and freely mounted upon the stub shaft 41.

The clutch supporting plate or disk 48 is keyed to the shaft 41 by means of the key 49, and supports the annular expanding clutch band 50 with lining 51 attached thereto for engagement with the inner wall 52 of the idler gear 47. One end of the annular band 50 is anchored upon the screw bolt 53 threaded into said plate or disk 48, while the other end of said band 50 is connected to an end 54 of the bellcrank clutch operating lever 55, which is pivoted at 56 and formed on its opposite end with a finger 57 which is engaged by the conical surface 58 on the inner end of the sliding clutch collar 42 when pushed inwardly by the movement of the clutch operating lever 59 connected therewith by means of the clutch operating fork 60 which is formed with the inwardly directed opposed clutch fingers 61 adapted to ride in the angular grooves 62 formed about the clutch collar 42.

A pair of pivoted attaching toothed dogs 63 and 64 are mounted upon the frame 1 for holding the straw line puller in fixed position while the same is in use.

Having thus described my invention what I claim as new and desire to secure by Letters Patent of the United States is:

1. A device of the character described comprising a hollow stationary shaft, a reel drum rotatably mounted on said shaft, one end of said drum including a disc plate, brake means for selective engagement with said disc plate comprising a bolt longitudinally movable in said shaft and a block secured to said bolt, drive means secured to the other end of said drum and operating means secured to said drive means for rotating said drum.

2. The combination of claim 1 wherein said brake means includes a brake disc secured to said brake block, a bore in said brake disc, said bolt secured in said bore and a brake lever secured on said bolt for actuating said brake means.

3. A device of the character described comprising a hollow stationary shaft, a reel drum rotatably mounted on said shaft, one end of said drum including a disc plate, brake means for selective engagement with said disc plate comprising a bolt longitudinally movable in said shaft and a block secured to said bolt, a ring gear secured on the other end of said drum, a bracket arm secured to said drum, said bracket arm supporting a stub shaft, drum operating means secured on said stub shaft and clutch means mounted on said stub shaft for selectively engaging said drum operating means with said ring gear.

4. The combination of claim 3 wherein said clutch means includes a sliding clutch collar and clutch support plate mounted on said stub shaft, a bell crank lever secured to said drum operating means, a clutch band secured to said clutch support plate and a bell crank lever and a clutch lever secured to said clutch means for actuating said clutch means.

5. The combination of claim 1, wherein pivoted holding dogs are provided to support said device in fixed position while in operation.

RICHARD H. SNYDER.

REFERENCES CITED

The following references are of record in the file of this patent:

UNITED STATES PATENTS

| Number | Name | Date |
|---|---|---|
| 150,653 | Brown | May 5, 1874 |
| 246,402 | McClure | Aug. 30, 1881 |
| 254,881 | McClure | Mar. 14, 1882 |
| 1,425,792 | Pignani | Aug. 15, 1922 |

FOREIGN PATENTS

| Number | Country | Date |
|---|---|---|
| 193,192 | Great Britain | Feb. 22, 1923 |